United States Patent [19]
Tajiri

[11] Patent Number: 6,072,758
[45] Date of Patent: Jun. 6, 2000

[54] DISC RECORDING AND/OR REPRODUCTION APPARATUS AND METHOD THEREOF

[75] Inventor: Takashi Tajiri, Saitama, Japan

[73] Assignee: Sony Corporation, Tokyo, Japan

[21] Appl. No.: 08/957,293

[22] Filed: Oct. 24, 1997

[30] Foreign Application Priority Data

Oct. 25, 1996 [JP] Japan .................................. 8-283526

[51] Int. Cl.$^7$ ....................................................... G11B 7/00
[52] U.S. Cl. .................................. 369/58; 369/54; 369/47
[58] Field of Search .............................. 369/58, 47, 48, 369/49, 50, 54, 59, 60, 32, 44.11, 44.25, 44.27, 44.28, 44.29, 44.34, 44.37, 44.41

[56] References Cited

U.S. PATENT DOCUMENTS 5,003,521  3/1991  Yoshida et al. .................. 369/44.25

FOREIGN PATENT DOCUMENTS 8-249801  9/1996  Japan .

*Primary Examiner*—Muhammad Edun
*Attorney, Agent, or Firm*—Frommer Lawrence & Haug, LLP.; William S. Frommer

[57] ABSTRACT

In accordance with the invention, an apparatus and method are provided in which it is possible to determine a type of disc which has been loaded before servoing is locked. A disc is rotated by a spindle motor, and a pickup is gradually moved toward the disc from a position spaced apart from the disc. A peak value of an obtained reflection is detected by a peak hold circuit is stored into a CPU. If the disc is a DVD (by way of example), a single layer DVD has a reflectivity higher than that of a double layer DVD. Accordingly, a single layer DVD and a double layer DVD can be discriminated from each other from the value of the peak reflection value obtained by the peak hold circuit.

44 Claims, 16 Drawing Sheets

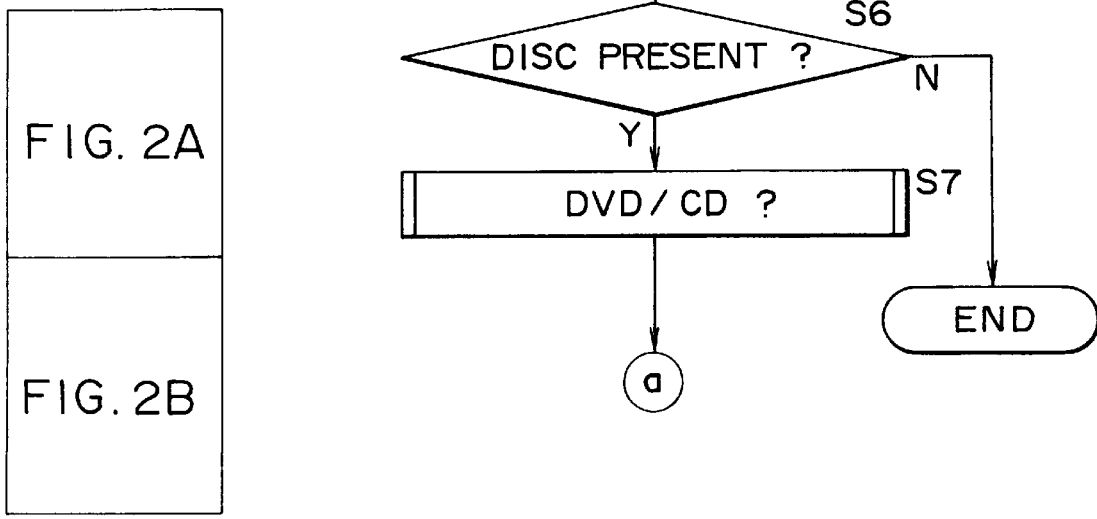

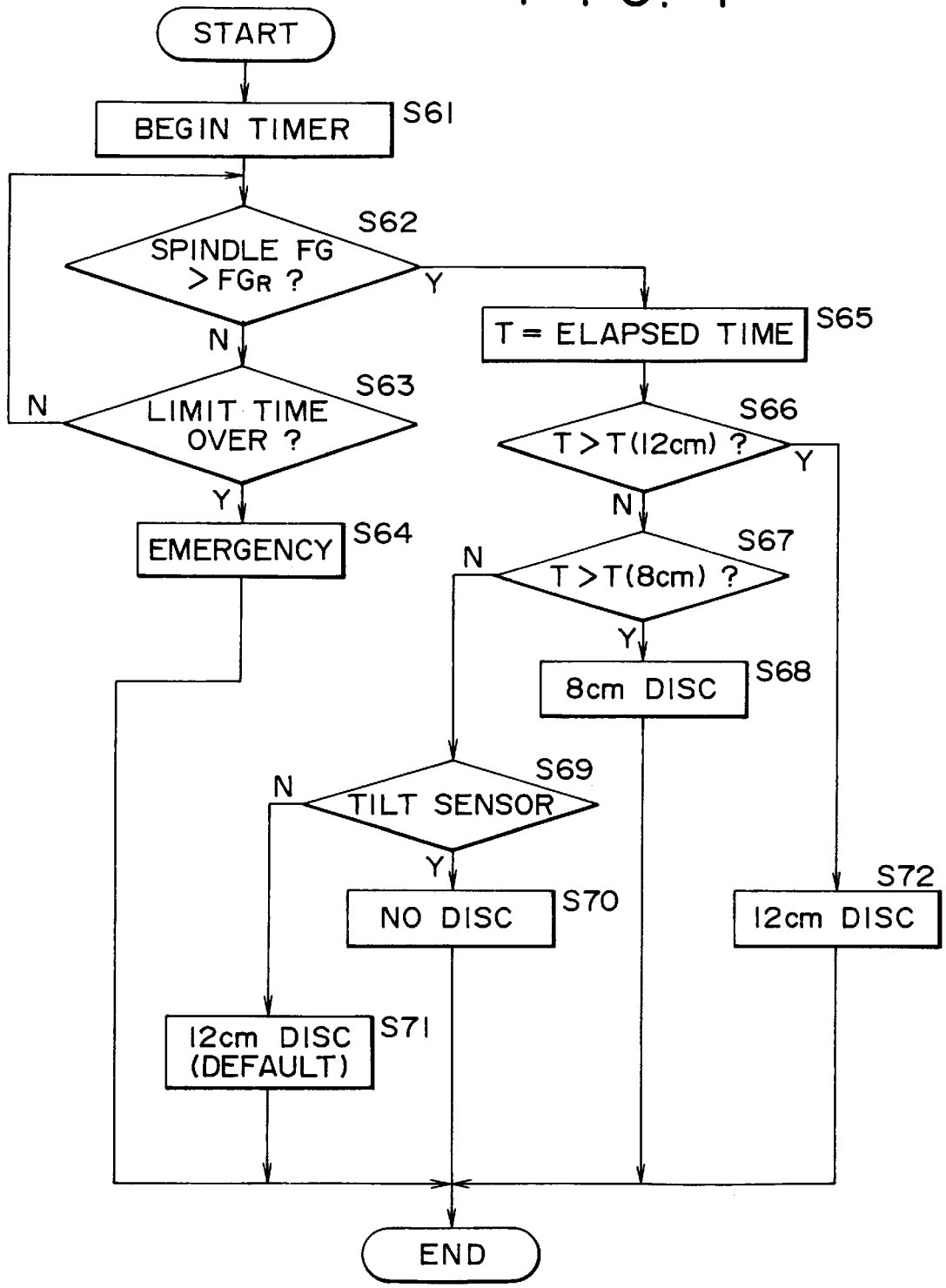

FIG. 8B FOCUS DRIVE

FIG. 8C FOCUS ERROR

DATA SECTOR CONFIGURATION

FIG. 10

| b31 | b24 b23 | | | | | | | b0 |
|---|---|---|---|---|---|---|---|---|
| SECTOR INFORMATION | | | | | SECTOR NUMBER | | | |

| b31 | b30 | b29 | b28 | b27 | b26 | b25 | b24 |
|---|---|---|---|---|---|---|---|
| SECTOR FORMAT TYPE | TRACKING METHOD | REFLECTIVITY | RESERVED | AREA TYPE | | DATA TYPE | LAYER NUMBER |

SECTOR INFORMATION

SECTOR FORMAT TYPE ····· 0b : CLV FORMAT TYPE SPECIFIED FOR READ-ONLY DISC AND RECORDABLE DISC
　　　　　　　　　　　　　1b : ZONED FORMAT TYPE SPECIFIED FOR REWRITABLE DISC

TRACKING METHOD ····· 0b : PIT TRACKING
　　　　　　　　　　　1b : GROOVE TRACKING SPECIFIED FOR REWRITABLE DISC

REFLECTIVITY ····· 0b : MORE THAN 40%
　　　　　　　　　1b : LESS THAN OR EQUAL TO 40%

AREA TYPE ····· 00b : DATA AREA
　　　　　　　01b : LEAD-IN AREA
　　　　　　　10b : LEAD-OUT AREA
　　　　　　　11b : MIDDLE AREA OF READ-ONLY DISC

DATA TYPE ····· 0b : READ-ONLY DATA
　　　　　　　1b : RESERVED FOR RECORDABLE DATA (LINKING DATA) AND REWRITABLE DATA

LAYER NUMBER ····· 0b : LAYER 0
　　　　　　　　　1b : LAYER 1

STRUCTURE OF ONE CONTROL DATA BLOCK

FIG. 12

PHYSICAL FORMAT INFORMATION

| BP | CONTENTS | NUMBER OF BYTES |
|---|---|---|
| 0 | BOOK TYPE AND PART VERSION | 1 BYTE |
| 1 | DISC SIZE AND MINIMUM READ-OUT RATE | 1 BYTE |
| 2 | DISC STRUCTURE | 1 BYTE |
| 3 | RECORDED DENSITY | 1 BYTE |
| 4 TO 15 | DATA AREA ALLOCATION | 12 BYTES |
| 16 | BCA DESCRIPTOR | 1 BYTE |
| 17 TO 31 | RESERVED | 15 BYTES |
| 32 TO 2047 | RESERVED | 2016 BYTES |

NOTE : BP 0 TO 31 ARE THE DATA COMMONLY USED FOR DVD FAMILY.
BP 32 TO 2047 ARE USED FOR UNIQUE INFORMATION FOR EACH BOOK.

FIG. 13

DISC SIZE AND MINIMUM READ-OUT RATE

| b7 | b6 | b5 | b4 | b3 | b2 | b1 | b0 |
|----|----|----|----|----|----|----|----|
| \multicolumn{4}{c|}{DISC SIZE} | \multicolumn{4}{c|}{MINIMUM READ-OUT RATE} |

DISC SIZE ... 0000b : 12cm DISC
0001b : 8cm DISC
OTHERS : RESERVED

MINIMUM READ-OUT RATE ... 0000b : 2.52 Mbps
0001b : 5.04 Mbps
0010b : 10.08 Mbps
OTHERS : RESERVED

F I G. 14

DISC STRUCTURE

| b7 | b6 | b5 | b4 | b3 | b2 | b1 | b0 |
|---|---|---|---|---|---|---|---|
| RESERVED | NUMBER OF LAYERS | | TRACK PATH | LAYER TYPE | | | |

NUMBER OF LAYERS ... 00b : SINGLE
01b : DUAL
OTHERS : RESERVED

TRACK PATH ... 0b : PARALLEL TRACK PATH OR SINGLE LAYER
1b : OPPOSITE TRACK PATH

LAYER TYPE ... 0001b : COMPLETELY READ-ONLY LAYER
OTHERS : RESERVED

EACH BIT SHALL BE ASSIGNED ACCORDING TO THE FOLLOWING RULE IN EVERY DVD DISC.

b3 ... RESERVED (0)
b2 ... 0b : DISC DOES NOT CONTAIN REWRITABLE USER DATA AREA (S)
1b : DISC CONTAINS REWRITABLE USER DATA AREA (S)
b1 ... 0b : DISC DOES NOT CONTAIN RECORDABLE USER DATA AREA (S)
1b : DISC CONTAINS RECORDABLE USER DATA AREA (S)
b0 ... 0b : DISC DOES NOT CONTAIN EMBOSSED USER DATA AREA (S)
1b : DISC CONTAINS EMBOSSED USER DATA AREA (S)

DISC RECORDING AND/OR REPRODUCTION APPARATUS AND METHOD THEREOF

BACKGROUND OF THE INVENTION

This invention relates generally to a disc recording and/or reproduction apparatus and method, and more particularly to a disc recording and/or reproduction apparatus and method thereof by which the type of disc loaded into the apparatus can be quickly and accurately determined.

Recently, standards for a DVD (Digital Versatile Disc) have been established and are being propagated. For the DVD, standards for a single layer disc (Single Layer Disc) (SL disc) which includes a single information recording layer and a dual layer disc (Dual Layer Disc) (DL disc) which includes two information recording layers have been defined. Since these two discs have different characteristic reflectivities from each other, certain adjustments in hardware must be made during use. Specifically, the power of the laser light utilized for recording or reproducing data, the amount of gain employed when a reproduction RF signal is amplified and so forth must be set to predetermined values of parameters corresponding to the type of disc being utilized.

A DVD is recorded with identification data which allows a determination of whether a particular disc is a single layer disc or a double layer disc. This identification is recorded on a control data area of the disc, and indicates the number of layers present on the disc. Therefore, it is possible to discriminate between the single layer disc and a double layer disc by reading the control data area of the disc.

However, data from the control data area, including the indication of disc type, can only be read after servoing of the recording and/or reproduction apparatus has been stabilized. Thus, setting of parameters of the disc recording and/or reproduction apparatus such as laser power for recording and/or reproduction or the amplification gain for reproduction must be performed before the servoing becomes stable. Therefore, data contained in the control data area cannot be utilized to set parameters for the apparatus.

OBJECTS OF THE INVENTION

Accordingly, it is an object of the invention to provide an improved disc recording and/or reproduction apparatus and method which overcomes the drawbacks of the prior art.

Another object of the invention is to provide an improved disc recording and/or reproduction apparatus and method in which a disc type is quickly and accurately determined.

A further object of the invention is to provide an improved disc recording and/or reproduction apparatus and method in which a disc type is quickly and accurately determined before servoing is stabilized.

Yet another object of the invention is to provide an improved disc recording and/or reproduction apparatus and method in which a disc type is quickly and accurately determined, and various apparatus parameters are set based thereupon, before servoing is stabilized.

Still other objects and advantages of the invention will in part be obvious and will in part be apparent from the specification.

SUMMARY OF THE INVENTION

Generally speaking, in accordance with the invention a disc recording and/or reproduction apparatus is provided, and comprises an irradiator for irradiating light for recording or reproducing data upon a disc, a controller for controlling focusing servoing of the irradiator, and a mover for moving the irradiator from a first position to a second position in a direction along a radius of the disc and in a direction perpendicular to a tangent to an outer circumference of the disc. The apparatus further includes a discriminator for comparing a level of energy corresponding to light reflected from the disc during either a recording or reproduction operation when the irradiator moves from a first position to a second position with a predetermined reference level, and determining the type of disc which is loaded in the apparatus as a result of the comparison.

A disc recording and/or reproduction method is also provided. First, a pickup for irradiating light upon a disc is moved form a first position to a second position in a direction along a radius of the disc and in a direction perpendicular to a tangent to an outer circumference of the disc during either a recording or reproduction operation. When the pickup is moved form the first position to the second position, a level of energy corresponding to light reflected from the disc is compared with a predetermined reference level, and the type of disc which is loaded in the apparatus is determined as a result of the comparison.

An additional disc recording and/or reproduction apparatus is also provided, and comprises rotation means for rotating a disc, first determination means for determining the size of the disc based upon a measurement of the relationship of the speed of rotation of the disc per unit time, irradiation means for irradiating light onto the disc, detection means for detecting a level of light reflected from the disc, and second determination means for determining the presence or absence of a disc in accordance with the results provided by the first determination means and the detection means.

An additional disc recording and/or reproduction method is also provided. This method comprises the steps of rotating a disc and determining the size of the disc based upon a measurement of the relationship of the speed of rotation of the disc per unit time. Light is irradiated on the disc, and the reflected light is then detected. It is then determined whether a disc is present based upon the determined size and the amount of reflected light which is detected.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 4 is a flow chart illustrating processing for determining disc size in step S4 of FIG. 2;

FIGS. 8A to 8D are views illustrating the determination of whether a DVD is of the single or double layer type in coordination with operation of an optical pickup;

FIG. 10 is a view illustrating the configuration of the sector ID of FIG. 9;

FIG. 12 is a view illustrating the configuration of the physical format information of the control data block of FIG. 11;

FIG. 13 is a view illustrating the configuration of a disc size and a minimum read-out rate relationship of FIG. 12; and FIG. 14 is a view illustrating the configuration of disc structure information of FIG. 12.

DETAILED DESCRIPTION OF THE PREFERRED EMBODIMENTS

Figure 1:
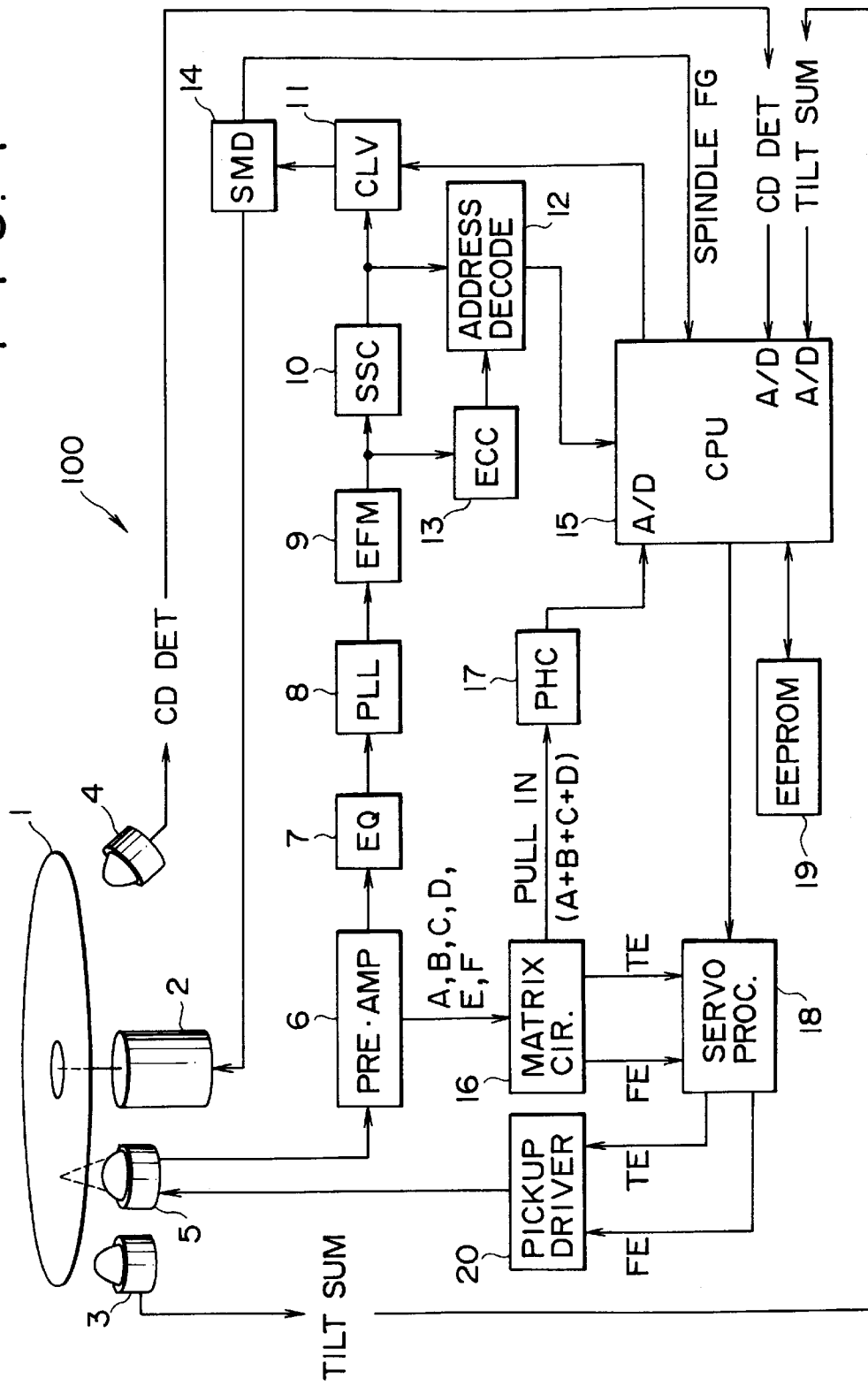
FIG. 1 is a block diagram depicting a disc recording and/or reproduction apparatus constructed in accordance with a first embodiment of the invention.

Referring first to FIG. 1, a block diagram depicts a disc recording and/or reproduction apparatus, indicated generally at 100, constructed in accordance with a first embodiment of the invention. In apparatus 100, disc 1 is rotated at a predetermined speed by a spindle motor 2. In a preferred embodiment, disc 1 may be a CD or a DVD. A tilt sensor 3 includes an LED and a photodiode (not shown). The photodiode of tilt sensor 3 receives light irradiated by the LED and reflected from disc 1 to detect whether there is any inclination of disc 1. The result of this determination is output as a tilt sum (Tilt Sum) to a CPU 15. A CD discrimination sensor 4 includes an LED and a photodiode (not shown). Sensor 4 irradiates light emitted from the LED thereof upon disc 1, and based upon reflected light received by the photodiode thereof determines whether or not the track pitch of disc 1 is 1.6 μm, which would indicate that disc 1 is a CD. A detection signal CD Det is then output to CPU 15 representative of whether or not disc 1 is a CD.

A pickup 5 includes a laser diode and a photodiode (not shown). Pickup 5 performs recording or reproduction operations by irradiating laser light emitted from the laser diode thereof upon the disc 1 and receiving reflected light from disc 1 by the photodiode thereof. A preamplifier 6 amplifies a signal obtained by the photo-electric conversion of light received by the photodiode of pickup 5 and outputs the amplified signal to an equalizer 7. Equalizer 7 equalizes the signal inputted thereto so that it has a predetermined characteristic, and outputs the equalized signal to a Phase Locked Loop (PLL) circuit 8. PLL circuit 8 produces a clock signal from the signal inputted thereto and outputs the clock signal together with the original equalized signal to an EFM decoder 9.

EFM decoder 9 EFM+ demodulates the reproduced signal inputted thereto from PLL circuit 8 in synchronism with the clock signal inputted thereto from PLL circuit 8 and outputs the resulting of the signal demodulation to a synchronizing separation circuit 10 (SSC) and an Error Correction Circuit (ECC) 3. Synchronizing separation circuit 10 separates a synchronizing signal from the signal inputted thereto and outputs the synchronizing signal to a CLV controller 11 and an address decoder 12. ECC circuit 13 performs error correction for the demodulated data inputted thereto from EFM decoder 9 and outputs the resulting data to address decoder 12. Address decoder 12 decodes an address and outputs the decoded address to CPU 15. This address is determined with reference to the synchronizing signal supplied thereto from synchronizing separation circuit 10 and from the data which have been supplied from ECC circuit 13 and for which error correction has been performed.

CPU 15 controls CLV controller 11, which in turn CLV controller 11 controls a spindle motor driver (SMD) 14 to drive spindle motor 2. Spindle motor driver 14 generates a spindle FG signal corresponding to a frequency of rotation of spindle motor 2 and outputs the spindle FG signal to CPU 15.

Pickup 5 records or reproduces data using a 3-beam method when reproducing data from a CD, and using a 1-beam method when reproducing data from a DVD. Four photodiodes A to D for receiving laser light during either a recording or reproduction operation are provided, photodiodes A–D being arranged in a square configuration. An additional pair of photodiodes E and F receive laser light for tracking of a CD.

Preamplifier 6 outputs signals received from photodiodes A to F to a matrix circuit 16. Matrix circuit 16 adds the outputs of photodiodes A to D and outputs a resulting signal as a pull in (Pull In) signal to a peak hold circuit (PHC) 17. Peak hold circuit 17 holds a peak value of the pull in signal inputted thereto and outputs this peak value to CPU 15.

Matrix circuit 16 calculates a diagonal signal provided by a difference which is represented by the equation ((A+C)−(B+D)) of sums of the outputs of photodiodes A–D, and which are arranged on diagonals. The diagonal signal is then set as a focusing error signal (FE). Further, where the disc loaded is a CD, a difference, which is represented by the equation (E−F), of the outputs of photodiodes E and F is calculated and set as a tracking error signal (TE). Where the disc loaded is a DVD, a tracking error signal is produced from the diagonal signal and the pull in signal based on a DPD (Differential Phase Detection) method. A servo processor 18 receives the focusing error signal and the tracking error signal from matrix circuit 16 and suitably adjusts and outputs the signals (TE', FE') to a pickup driver 20. Pickup driver 20 drives pickup 5 in a focusing direction (towards or away from disc 1) or a tracking direction (in a direction along a radius and perpendicular to a tangent to an outer circumference of disc 1) in response to the focusing error signal and the tracking error signal. Further, servo processor 18 drives pickup 5 in the radial direction of the disc 1 so as to effect threading servoing.

An EEPROM 19 stores the pull in level, which is one of a number of predetermined parameters based upon the type of disc. A level PI(sldisc.slmode) of the pull in signal is stored when a single layer disc is reproduced when the apparatus is in a single layer mode, and a level PI(dldisc.dlmode) of the pull in signal is stored when a double layer disc is reproduced when the apparatus is in a double layer mode.

Referring next to the flowchart of FIGS. 2 and 3, operation of the disc recording and/or reproduction apparatus upon startup will be described. First in step S1, the CPU 15 controls pickup 5 via servo processor 18 to initially set the power of laser diodes A–F and the gains of preamplifier 6 in accordance with the predetermined parameters for a single layer disc, thus putting pickup 5 into a single layer mode.

Then in step S2, CPU 15 turns on the laser diode of pickup 5 to irradiate laser light upon disc 1. In step S3, CPU 15 drives tilt sensor 3 so that light generated from the LED of tilt sensor 3 is irradiated upon disc 1. Tilt sensor 3 receives reflected light from disc 1, detects any inclination of disc 1 and outputs the result as a tilt sum signal to CPU 15. CPU 15 controls tilt servoing in response to the tilt sum signal so that any measured inclination of disc 1 may be removed and disc 1 can be positioned perpendicular to an optical axis of the laser light emitted from pickup 5.

In step S4, CPU 15 controls spindle motor driver 14 via CLV controller 11 to drive spindle motor 2 with a fixed torque. Consequently, disc 1 is driven to rotate by spindle motor 2.

Then, in steps S5 and S6, CPU 15 determines the presence and size of the disk. Reference is next made to FIG. 4 in addition to FIGS. 2 and 3 in order to more completely describe this procedure.

In step S61, CPU 15 begins the measurement of a time interval, which has a predetermined limit. In step S62, CPU 15 determines whether or not the spindle FG outputted from spindle motor driver 14, which is equal to the rotational speed of disc 1 and spindle motor 2, is higher than a predetermined reference rotational speed $FG_R$.

Figure 5:
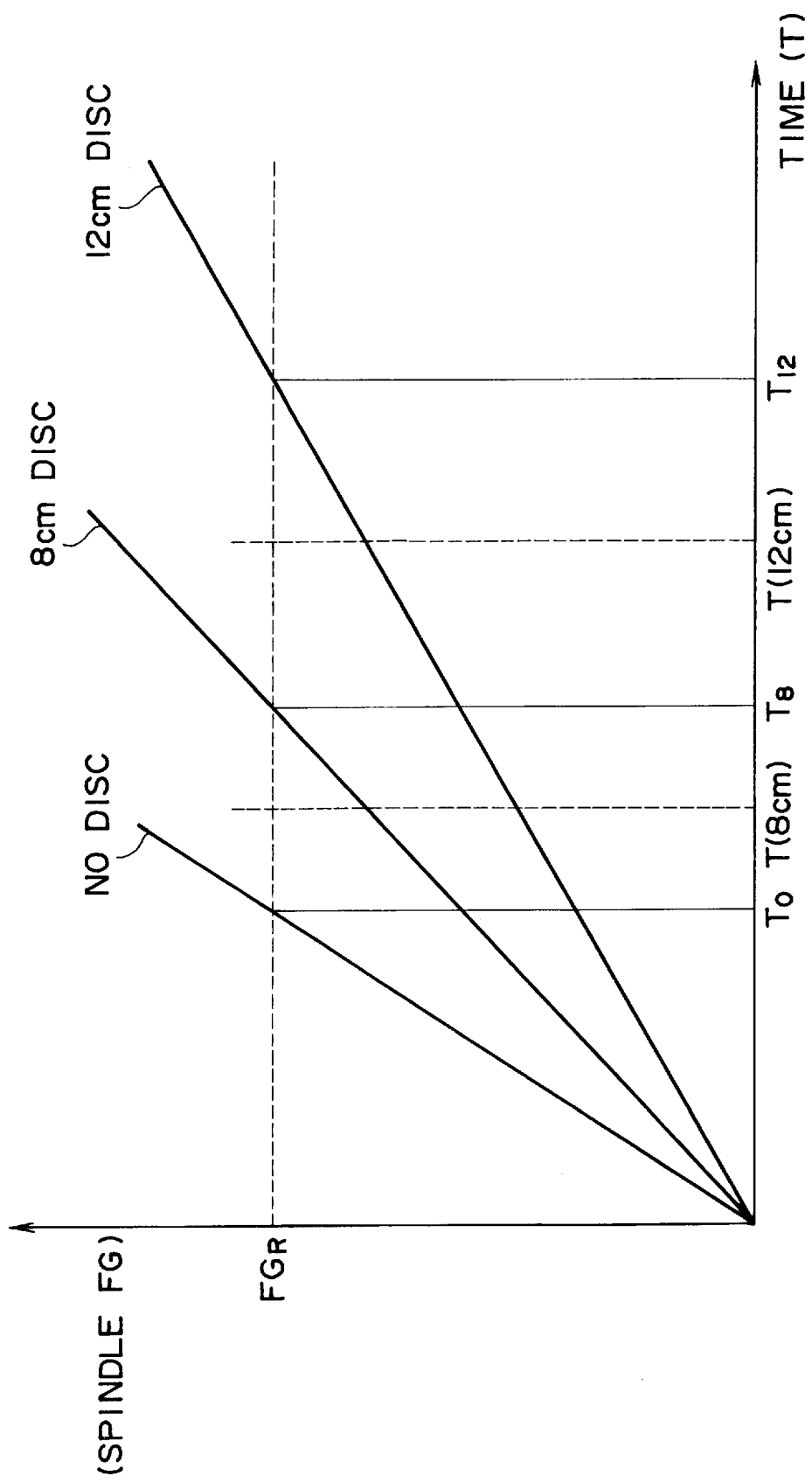
FIG. 5 is a graph illustrating a comparison of the time a disc takes to reach a predetermined rotational speed when different size discs are rotated.

In particular, as is shown in FIG. 5, after rotation of spindle motor 2 begins in step S4, the rotational speed thereof increases linearly and reaches the reference rotational speed (aimed FG frequency) $FG_R$ after a time period T elapses.

Step S62 iteratively checks the speed FG to determine if reference rotational speed $FG_R$ has been reached. If it is determined in step S62 that the spindle FG is not higher than the reference rotational speed $FG_R$, the control advances to step S63, in which it is determined whether or not the predetermined limit of the time interval (started in step S61) has been reached. If the predetermined limit of the time interval has not yet elapsed, then control returns to step S62. Thus it is again determined whether or not the value of the spindle FG is higher than the reference rotational speed $FG_R$.

The operations described above are executed repeatedly until it is determined that the value of the spindle FG is higher than the target rotational speed $FG_R$. Control then advances to step S65, in which CPU 15 sets the value of the measured time interval in which the proper rotational speed was reached to a register T.

A disc may have a diameter of 8 cm or of 12 cm. A disc whose diameter is 12 cm places a higher load on spindle motor 2 than a disc whose diameter is 8 cm. Accordingly, the time in which the rotational speed of spindle motor 2 reaches the reference rotational speed $FG_R$ is longer for a disc of 12 cm (Time=$T_{12}$) than a disc of 8 cm, as shown in FIG. 5. Further, when no disc 1 is loaded, since the load on spindle motor 2 is even lower, the time $T_0$ in which the target rotational speed $FG_R$ is reached is even shorter than time $T_8$.

In step S66 CPU, 15 determines whether or not time T (held in step S65) is longer than a reference value T(12 cm) which is set to a value intermediately between the time $T_8$ and the time T12. If it is determined that time T is longer than T(12 cm), control advances to step S72, since CPU 15 has determined that the disc loaded is a disc of 12 cm.

On the other hand, if it is determined in step S66 that time T is not longer than T(12 cm), then control advances to step S67, and it is determined whether or not time T is longer than another reference value T(8 cm). This reference value T(8 cm) is set to a value intermediately between time $T_o$ and time $T_8$. Accordingly, when it is determined that time T is longer than reference value T(8 cm), it is determined in step S68 that a disc of 8 cm has been loaded.

If it is determined in step S67 that time T is not longer than reference value T(8 cm), then control advances to step S69, in which it is determined whether an amount of reflected light received by tilt sensor 3 is lower than a predetermined reference value. If so, it is determined that no disc 1 is loaded. Therefore, in this instance, control advances to step S70, in which the CPU 15 determines that no disc 1 is loaded.

If it is determined in step S69 that the level of the amount of light received by tilt sensor 3 is higher than the predetermined reference value, it is then determined that a disc is loaded on the spindle motor 2. However, as has already been determined in steps S66 and S67, the apparatus has not recognized a disc of 12 cm or a disc of 8 cm. However, since there are only these two sizes of discs, it is therefore determined that an error has occurred during the determination of the size of the disc. Thus, the control advances to step S71, in which the apparatus defaults to indicate that a disc of 12 cm is loaded on spindle motor 2.

If it is determined in step S63 that the predetermined limit of the time interval has elapsed before the value of the spindle FG reaches the reference rotational speed $FG_R$, control advances to step S64, in which CPU 15 determines the some trouble or emergency has occurred and executes emergency processing.

Since the size of a disc is determined in steps S66 and S67 and if the apparatus indicates the disc is not any of the predetermined sizes, it is then further tested in step S69 from a detection signal of tilt sensor 3 whether or not a disc is present. Presence or absence of a disc using such a procedure can be determined with a higher degree of certainty than where such a determination is made based solely upon the output of tilt sensor 3. In a standard CD player or a laser disc player, it is determined that no disc is present when focusing servoing cannot be properly locked, after focusing servoing has been tried three times. In this case, a time of approximately 3 seconds is required to detect that no disc is present. However, in accordance with the present invention, absence of a disc can be detected more rapidly, typically within one second.

It is noted that the determination in step S69 may be performed not only based on tilt sensor 3 but also based on CD discrimination sensor 4.

Figure 6:
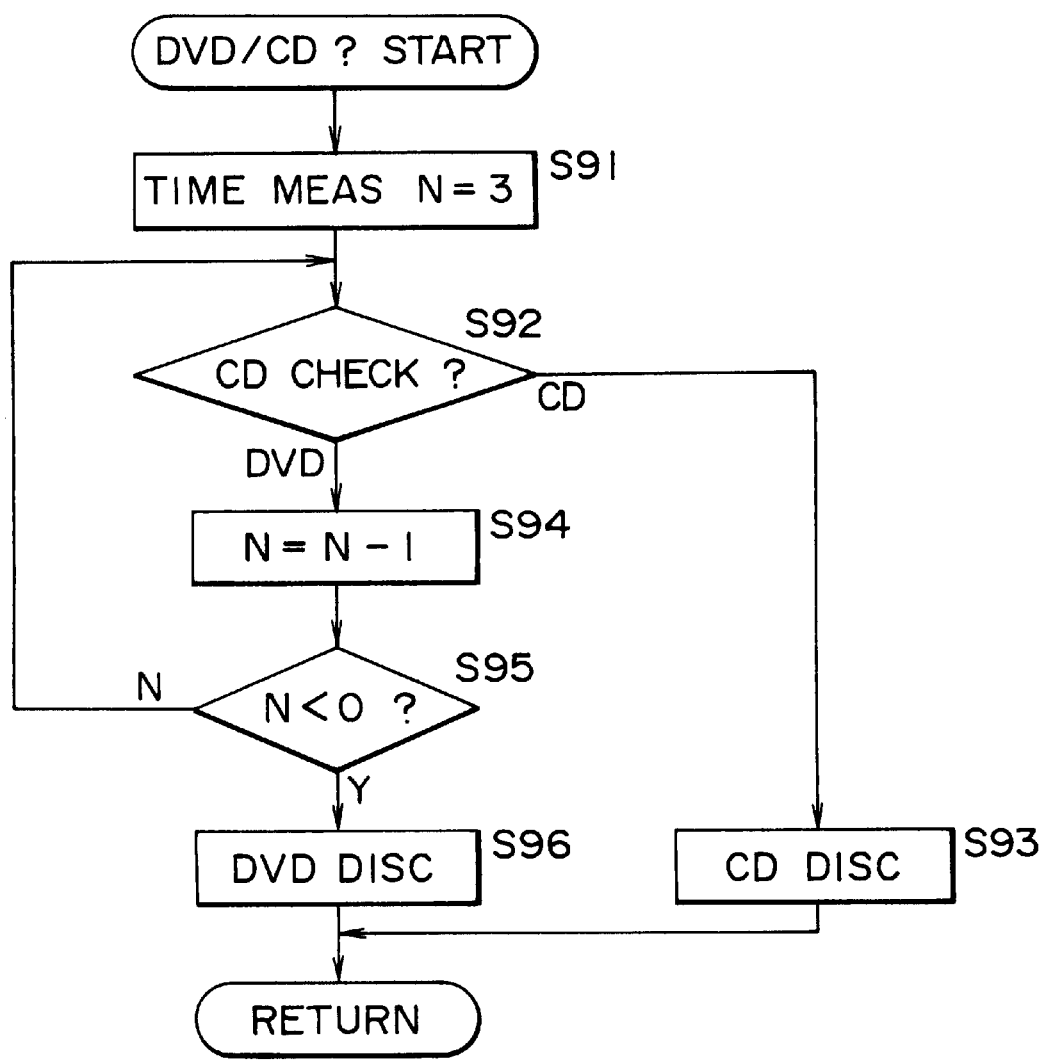
FIG. 6 is a flow chart illustrating processing for determining disc type in step S7 of FIG. 2.

Referring once again to FIG. 2, after the disc size has been determined in step S5, the presence or absence of a disc is determined in step S6 (as noted above). If it is determined that no disc is present, then the processing is ended. If it is determined that a disc is present, then control advances to step S7, in which a determination of whether the disc is a DVD or a CD is made, in accordance with the procedure as illustrated in a flow chart of FIG. 6.

First in step S91, the value 3 is initially set to a register N for storing a time measurement. In step S92, CD discrimination sensor 4 is checked. When CD discrimination sensor 4 outputs a detection signal indicating that a CD is loaded, control advances to step S93, in which CPU 15 determines that the disc loaded at present is a CD.

On the other hand, if it is determined in step S92 that a CD is not detected by CD discrimination sensor 4, this signifies that the disc loaded is a DVD. Thus, control advances to step S94, in which the value of register N is decremented by 1. Then, it is determined in step S95 whether or not the value of N is lower than 0. In the present case, since N is 2, it is not lower than 0. Therefore, control returns to step S92, in which CD discrimination sensor 4 is again checked. A predetermined period of time is allowed to elapse after CD discrimination sensor 4 is checked in the preceding cycle (N=3) before CD discrimination sensor 4 is checked in the present cycle (N=2). During this time interval, since disc 1 has rotated, the CD discrimination sensor 4 irradiates light on a different position of disc 1 and receives reflected light from disc 1 to effect detection processing. Accordingly, even if it is not detected the first time that the disc is a CD because of the presence of dust, soiling or other foreign matter, if another position at which dust or the like is not present is irradiated during the second cycle, then if the disc is a CD, it will be detected correctly.

In this manner, when CD discrimination sensor 4 does not output a signal indicating that a CD has been detected, CD discrimination sensor 4 is checked three times to insure a proper reading. If it is determined after checking three times that a signal indicating that a CD has been detected is not outputted from CD discrimination sensor 4, it is determined in step S95 that the value of register N is lower than 0. Control then advances to step S96, in which it is determined that the disc loaded is a DVD.

Figure 2B:
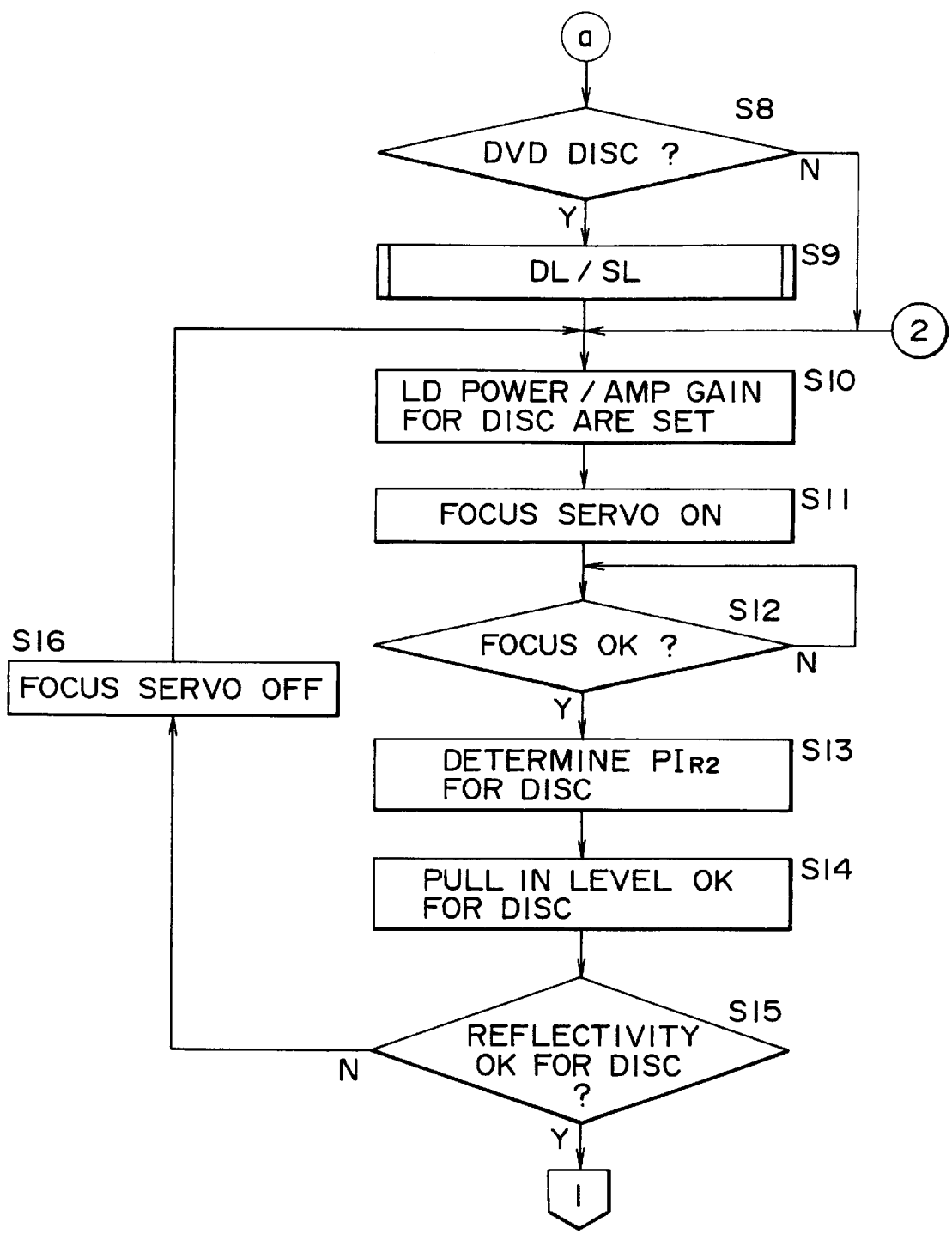
FIG. 2 is a flow chart illustrating operation of the disc recording and/or reproduction apparatus of FIG. 1 at startup.

After it is determined whether a DVD or a CD has been loaded, control advances to step S8 of FIG. 2, in which it is questioned whether or not the disc load at present is a DVD. If the disc loaded at present is a DVD, then control advances to step S9, in which it is determined whether the DVD is a single layer or a double layer disc. If the disc loaded at present is a CD, the processing in step S9 is skipped.

Figure 7:
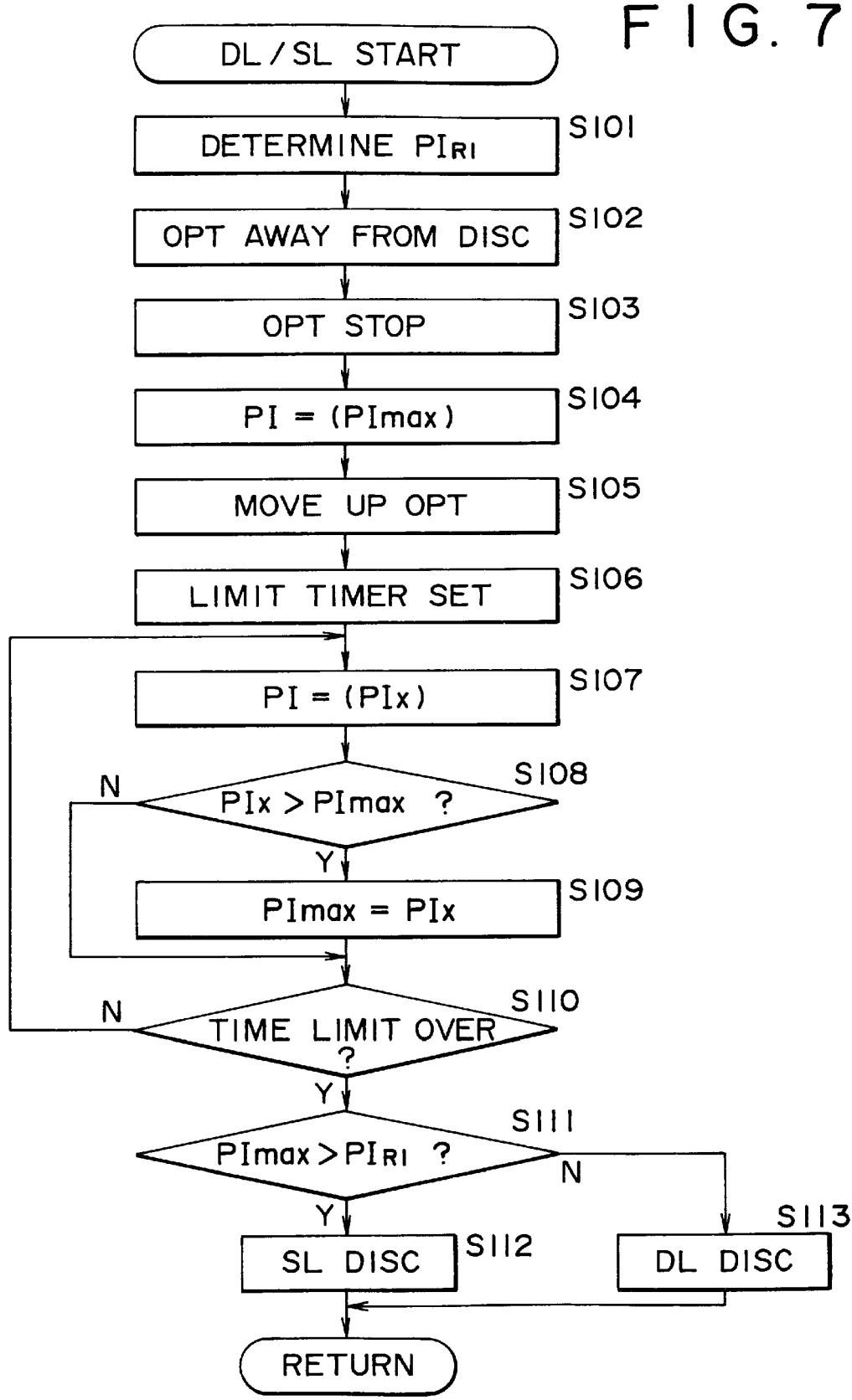
FIG. 7 is a flow chart illustrating processing for determining whether a DVD is of the single or double layer type in step S9 of FIG. 2.

Reference is next made to FIG. 7, which depicts the processing procedure for determining whether a DVD is of a single layer type or a double layer type. In particular, in step S101, CPU 15 calculates a threshold level $PI_{R1}$ in accordance with the following expression (dl=double layer, sl=single layer)

$$PIR1=(PI(dldisc,slmode)+PI(sldisc,slmode))/2=((PI(dldisc,dlmode)-PIref)\times(a/b)\times(c/d) +(PI(sldisc,slmode)-PIref)\times(e/f))\times(\frac{1}{2})+ pIref \quad (1)$$

In particular, where a single layer disc and a double layer disc are compared with each other, the single layer disc has a higher reflectivity while the double layer disc has a lower reflectivity.

PI(sldisc, slmode) is the level (except PIref Level which is a fixed DC component thereof) of the pull in signal when a single layer disc is reproduced in single layer mode and PI(dldisc, dlmode) is the level of the pull in signal when a double layer disc is reproduced in a double layer mode are stored in EEPROM 19.

Figures 8A, 8D:
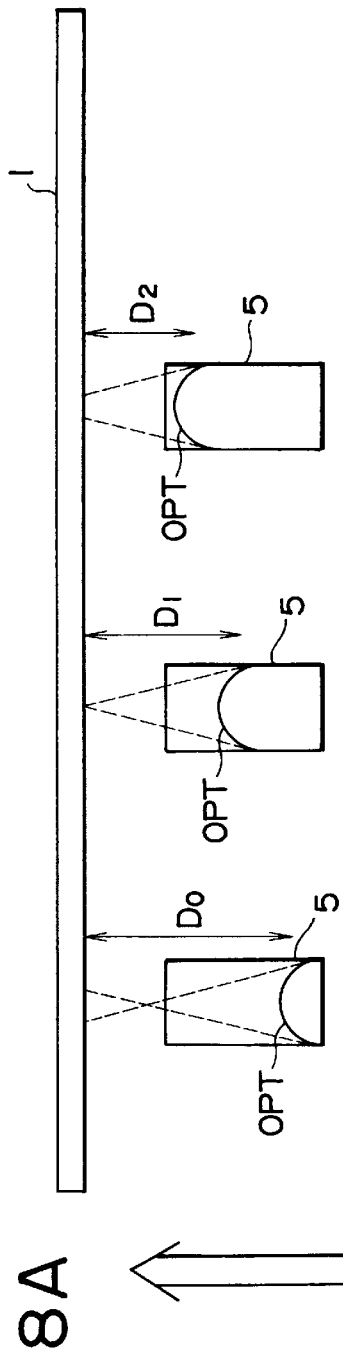

Threshold level $PI_{R1}$ is a threshold level of reflectivity for discrimination between a single layer disc and a double layer disc. If the focal point of the focal lens (OPT) of 5 is gradually moved from a remote position toward disc 1 as seen in FIG. 8(A) with a drive voltage illustrated in FIG. 8(B), then such a focusing error signal as illustrated in FIG. 8(C) is obtained. Then, as seen from FIG. 8(D), the pull in signal exhibits a maximum level when the focusing error signal crosses zero. Since the single layer disc has a higher reflectivity than the double layer disc, the level of the pull in signal in the proximity of the zero crossover point of the focusing error signal is higher with the single layer disc than with the double layer disc. Thus, the threshold level $PI_{R1}$ should be set to a predetermined value which is between the pull in signal of a single layer disc and the pull in signal of the double layer disc when the apparatus is set to operate in single layer mode (the default mode).

However, these values vary in proportion to laser power (LP) or the amplification gain (G). Further, they vary also depending upon whether focusing servoing is effective or not effective. Thus, the ratio of the values of parameters $LP_{SL}$ (laser power) and $LP_{DL}$ of the single layer mode and the double layer mode regarding the power of the laser is set to a:b as given by the following expression.

$$LP_{SL}: LP_{DL}=a:b$$

Similarly, the ratio between parameters $G_{SL}$ (gain) and $G_{DL}$ of the single layer mode and the double layer mode regarding the gain of the preamplifier is set to c:d as given by the following expression.

$$G_{SL}:G_{DL}=c:d$$

Furthermore, the ratio between the level PIfocusoff of the pull in signal when focusing servoing is off and the level PIfocuson of the pull in signal when focusing servoing is on is set to e:f as represented by the following expression.

$$PIfocusoff:PIfocuson=e:f$$

As a result, the level PI(dldisc,slmode) of the highest value of the pull in signal when a double layer disc is reproduced when the apparatus is operated in the single layer mode (the default mode) is represented by the following expression.

$$PI(dldisc,slmode)=(PI(dldisc,dlmode)-PIref)\times(a/b)\times(c/d)\times(e/f)+ PIref \quad (2)$$

Further, the highest level PI(sldisc,slmode) of the pull in signal when a single layer disc is reproduced when the apparatus is operated in the single layer mode is represented by the following expression.

$$PI(sldisc,slmode)=(PI(sldisc,slmode)-PIref)\times(e/f)+PIref \quad (3)$$

Accordingly, the expression (1) can be obtained from the expression (2) and the expression (3) given above.

After the threshold level PIR1 is calculated as described above, control advances to step S102 of FIG. 7, in which CPU 15 controls the lens OPT of pickup 5 to move in a direction away from disc 1. The movement is stopped in step S103. In this manner, the lens OPT of pickup 5 is stopped, for example, at a position a distance $D_0$ from disc 1 as seen in FIG. 8(A).

Pickup 5 irradiates laser light for recording or reproduction on disc 1 and receives reflected light from disc 1. Each photodiode A–E of pickup 5 receives the reflected light and outputs a signal corresponding to the amount of reflected light to preamplifier 6. Preamplifier 6 outputs signals corresponding to the levels of light received by photodiodes A to F to matrix circuit 16. Matrix circuit 16 adds the outputs of photodiodes A to D and outputs a resulting value to the peak hold circuit 17. Peak hold circuit 17 holds a peak value of the inputted pull in signal and outputs this result to CPU 15. CPU 15 thus holds, at step S104, the level of the PI signal is stored as $PI_{max}$ (at the maximum distance from disc 1) when the lens OPT of pickup 5 is positioned at the farthest position from disc 1.

Control then advances to step S105, in which CPU 15 controls servo processor 18 built therein causing pickup driver 20 to supply a focusing drive signal to pickup 5 as illustrated in FIG. 8(B). Consequently, the lens OPT of pickup 5 gradually moves perpendicularly in a direction toward the disc 1 as seen in FIG. 8(A).

In step S106, while the lens OPT of pickup 5 gradually moves towards disc 1, CPU 15 sets a timer built therein to count down a predetermined time interval. In step S107, CPU 15 places a current reading from the output of peak hold circuit 17 into a register PIx. Thereafter, control advances to step S108, in which CPU 15 compares the current peak hold value PIx held in step S107 to the peak hold value PImax held in step S104. If it is determined that PIx is higher than PImax, control advances to step S109, in which the value held in PIx is stored into PImax. If it is determined in step S108 that PIx is equal to or lower than PImax, then processing in step S109 is skipped.

Thereafter, control advances to step Silo, in which it is determined whether or not the predetermined time interval as set in step S106 has been reached by the timer. If the predetermined time interval has not yet been reached, then control returns to step S107 so that the processing in steps S107 et seq. may be executed repetitively. In this manner, the highest value of the level of the PI signal obtained as the lens OPT of pickup 5 gradually approaches the disc 1 is stored as PImax.

If it is determined in step S110 that the timer has reached the predetermined time interval, control advances to step S111, in which it is further determined whether or not PImax is higher than the threshold level $PI_{R1}$ calculated in step S101. As seen in FIG. 8(C), when the focusing error signal crosses zero, the lens OPT of pickup 5 is disposed at a position a distance $D_1$ from disc 1, as seen in FIG. 8(A). At this position, the PI signal is at its highest level as seen in FIG. 8(D). Thus, by the procedure noted above, this highest value is stored as PImax.

If the loaded disc is a single layer disc, then the value of PImax will be higher than the threshold level $PI_{R1}$ as seen in FIG. 8(D). Thus, if such a determination is made, control advances to step S112, in which CPU 15 determines that the loaded disc is a single layer disc. On the other hand, if the loaded disc is a double layer disc, the value of PImax will be lower than the threshold level $PI_{R1}$ as seen in FIG. 8(D). Thus, if such a determination is made, control advances to step S113, in which CPU 15 determines that the loaded disc is a double layer disc.

After the double layer/single layer determination processing has been completed, control advances to step S10 of FIG. 2. In step S10, CPU 15 re-sets the values of the power of the laser diode of pickup 5 and gains of preamplifier 6 and so forth in response to a result of the determination of the number of disc layers in step S9. Then, in step S11, CPU 15 controls the servo processor 18 to turn on focusing servoing. In step S12, CPU 15 waits until the focusing servoing is locked. Control then advances to step S13, in which CPU 15 performs calculation of another threshold level $PI_{R2}$. The value of the threshold level $PI_{R2}$ calculated in this instance is different depending upon whether the apparatus has been set to single layer mode or double layer mode.

When the apparatus has been set to single layer mode, the pull in level PI(dldisc,slmode) of a DL disc is represented by the following expression.

$$PI(dldisc,slmode)=(PI(dldisc,dlmode)-PIref)\times(a/b)\times(c/d)+PIref \quad (4)$$

Accordingly, the threshold level $PI_{R2SL}$ for determination of a single or double layer disc is represented by the following expression.

$$PIR2SL=(PI(dldisc,slmode)+PI(sldisc,slmode))/2=((PI(dldisc,dlmode)-PIref)\times(a/b)\times(c/d)+PIref+PI(sldisc,slmode))/2 \quad (5)$$

Further, if it is assumed that the apparatus is currently set to double layer mode, then an estimated pull in level PI(sldisc,dlmode) of a single layer disc is represented by the following expression.

$$PI(sldisc,dlmode)=(PI(sldisc,slmode)-PIref)\times(b/a)\times(d/c)+PIref \quad (6)$$

Accordingly, the threshold level $PI_{R2DL}$ for determination between a single and double layer disc is represented by the following expression.

$$PIR2DL=(PI(sldisc,dlmode)+PI(dldisc,dlmode))/2=((PI(sldisc,dlmode)-PIref)\times(b/2)\times(d/c)+PIref+PI(dldisc,dlmode))/2 \quad (7)$$

After calculation of the threshold level PIR2 (PIR2SL or $PI_{R2DL}$) control advances to step S14, in which it is again determined based on the threshold level $PI_{R2}$ calculated in step S13 whether the loaded disc is a single or double layer disc. In step S15, it is determined whether the mode re-set in step S10 and a result of the determination in step S14 match each other and whether the reflectivity matches the determined disc type. If they do not match, then control advances to step S16, in which the CPU 15 turns off the focusing servoing, and control returns to step S10. Then, in step S10, the parameters are re-set corresponding to the result of the determination made in step S14. In step S11, focusing servoing is turned on again and in step S12, it is determined whether the focusing servoing is locked. When the focusing servoing is locked the threshold level $PI_{R2}$ is again calculated in step S13. Then, in step S14, determination based on the threshold level PIR2 calculated in step S13 is performed again.

In this manner, in step S9, processing to discriminate between a double layer disc and a single layer disc is performed when focusing servoing is not locked, and then in step S14, a determination of whether the loaded disc is a double layer disc or a single layer disc is performed again when the focusing servoing is locked. By determining disc type twice in this manner, a more accurate result can be achieved.

Figure 3A:
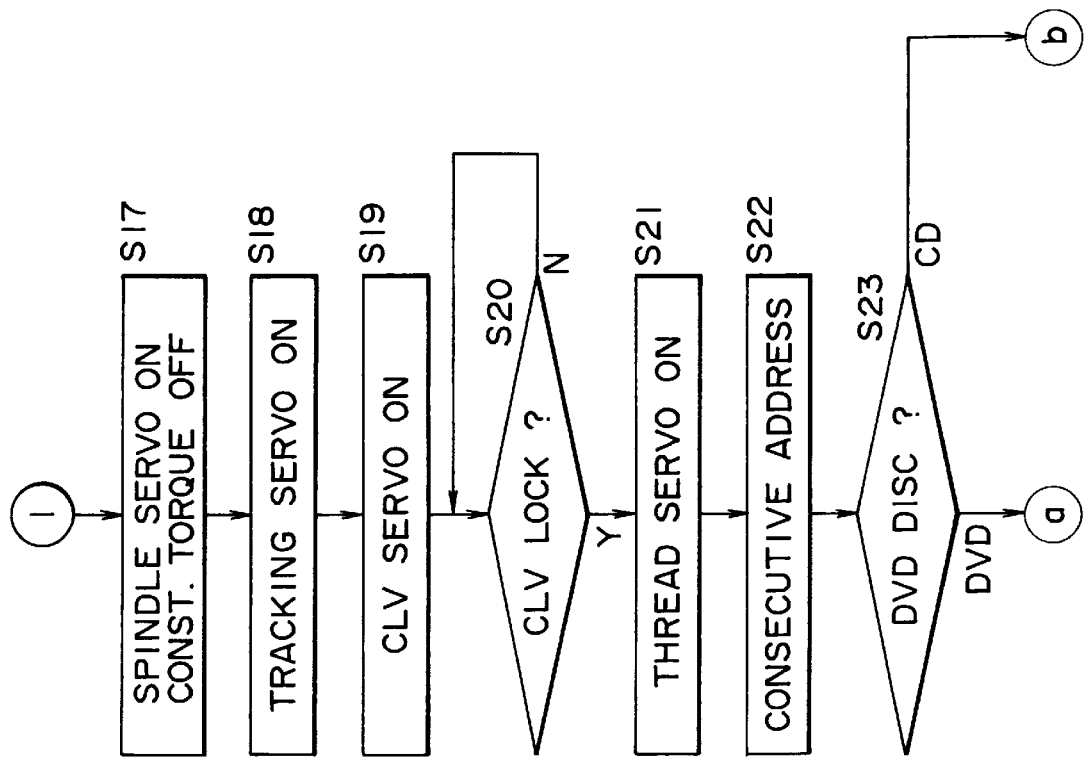
FIG. 3 is a flow chart continuing from FIG. 2.
Figure 3:
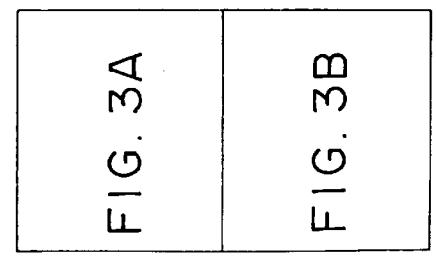
Figure 3B:
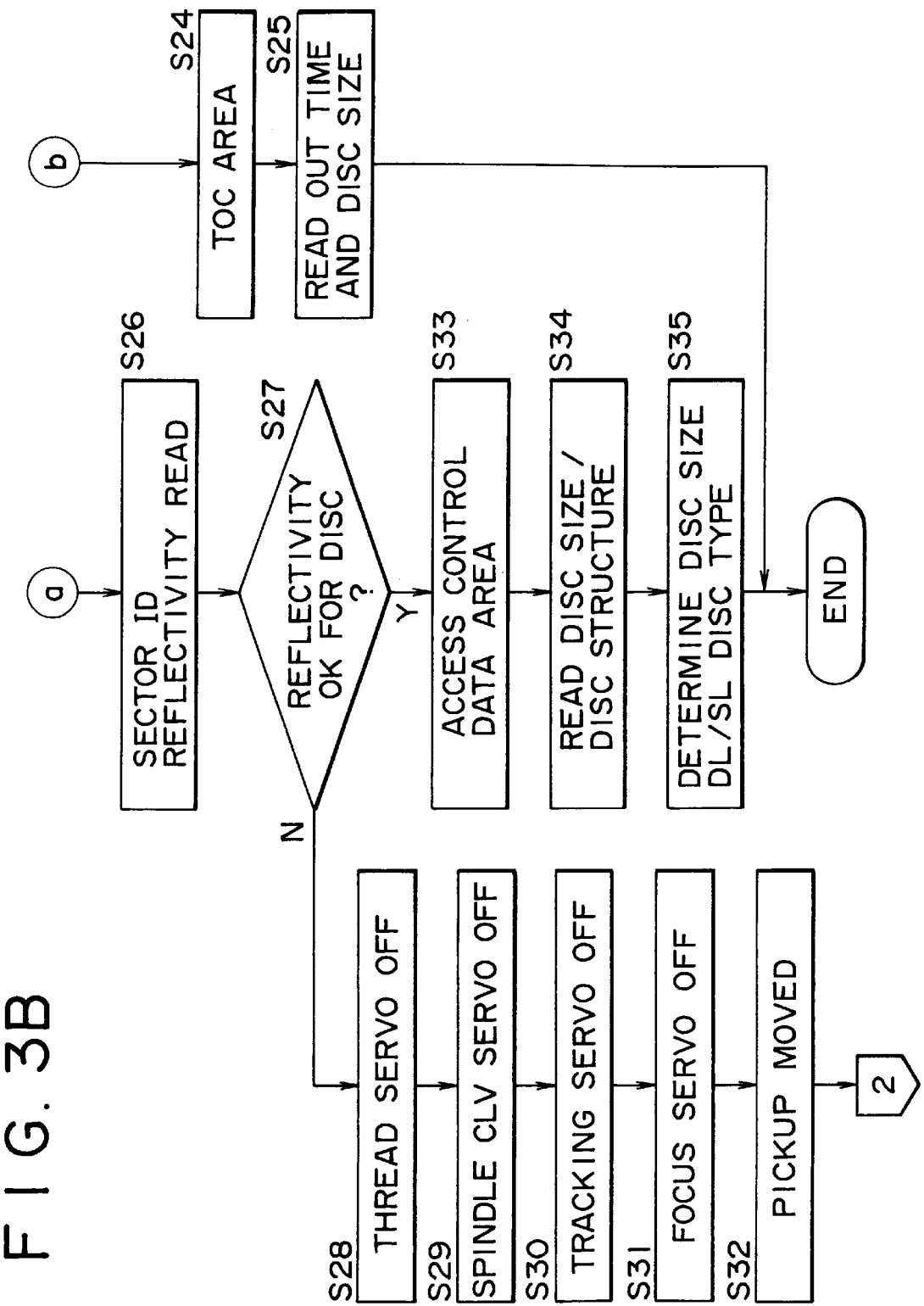

If it is determined in step S15 that the mode when the parameters are set in step S10 as a result of the first disc type determination, and the result of the second disc type determination in step S14 coincide with each other, then the control advances to step S17 (FIG. 3). In step S17, CPU 15 controls CLV controller 11 to turn off the constant torque acceleration operation of spindle motor 2 started in step S4 and to start rough servoing (frequency servoing) instead.

In step S18, the CPU 15 controls servo processor 18 to turn on tracking servoing. Further, in step S19, CPU 15 controls CLV controller 11 to turn on CLV servoing. In step S20, CPU 15 waits until the CLV servoing is locked. After CLV servoing is locked, control advances to step S21, in which CPU 15 controls servo processor 18 to turn on thread servoing. Thus, all servoing operations are started. As a result, it is possible for the apparatus to read data.

In order to read data, preamplifier 6 outputs a sum of the output of photodiodes A to D to equalizer 7 so that the output may be equalized by the equalizer 7. The equalized output is outputted to PLL circuit 8, which extracts a clock signal from the signal inputted thereto and outputs the clock signal and the original signal to EFM decoder 9. EFM decoder 9 EFM demodulates the inputted signal based on the inputted clock signal and outputs a resulting signal to synchronizing separation circuit 10 and ECC circuit 13. Synchronizing separation circuit 10 separates a synchronizing signal from the signal inputted thereto from EFM decoder 9 and outputs the synchronizing signal to CLV controller 11 and address decoder 12. CLV controller 11 executes CLV servoing in response to the synchronizing signal inputted thereto.

ECC circuit 13 performs error correction processing for the signal inputted thereto from EFM decoder 9 and outputs a resulting signal to address decoder 12. Address decoder 12 decodes the signal supplied thereto from ECC circuit 13 in accordance with the synchronizing signal supplied thereto from synchronizing separation circuit 10 and outputs the decoded result to CPU 15. In step S22, CPU 15 checks that the addresses from the output of address decoder 12 are consecutive. In a preferred embodiment CPU 15 checks whether or not addresses obtained over three sectors are consecutive.

In step S23, CPU 15 then checks whether or not the disc loaded at present is a DVD (this determination has already been made in step S7). If the disc is a CD, then control advances to step S24 in which pickup 5 is moved to a Table of Contents area of the CD. Then, in step S25, a read-out start time recorded in the Table of Contents area of the CD is read, and the size of the CD (whether the CD is 8 cm large or 12 cm large) is determined from the read-out start time.

Figure 9:
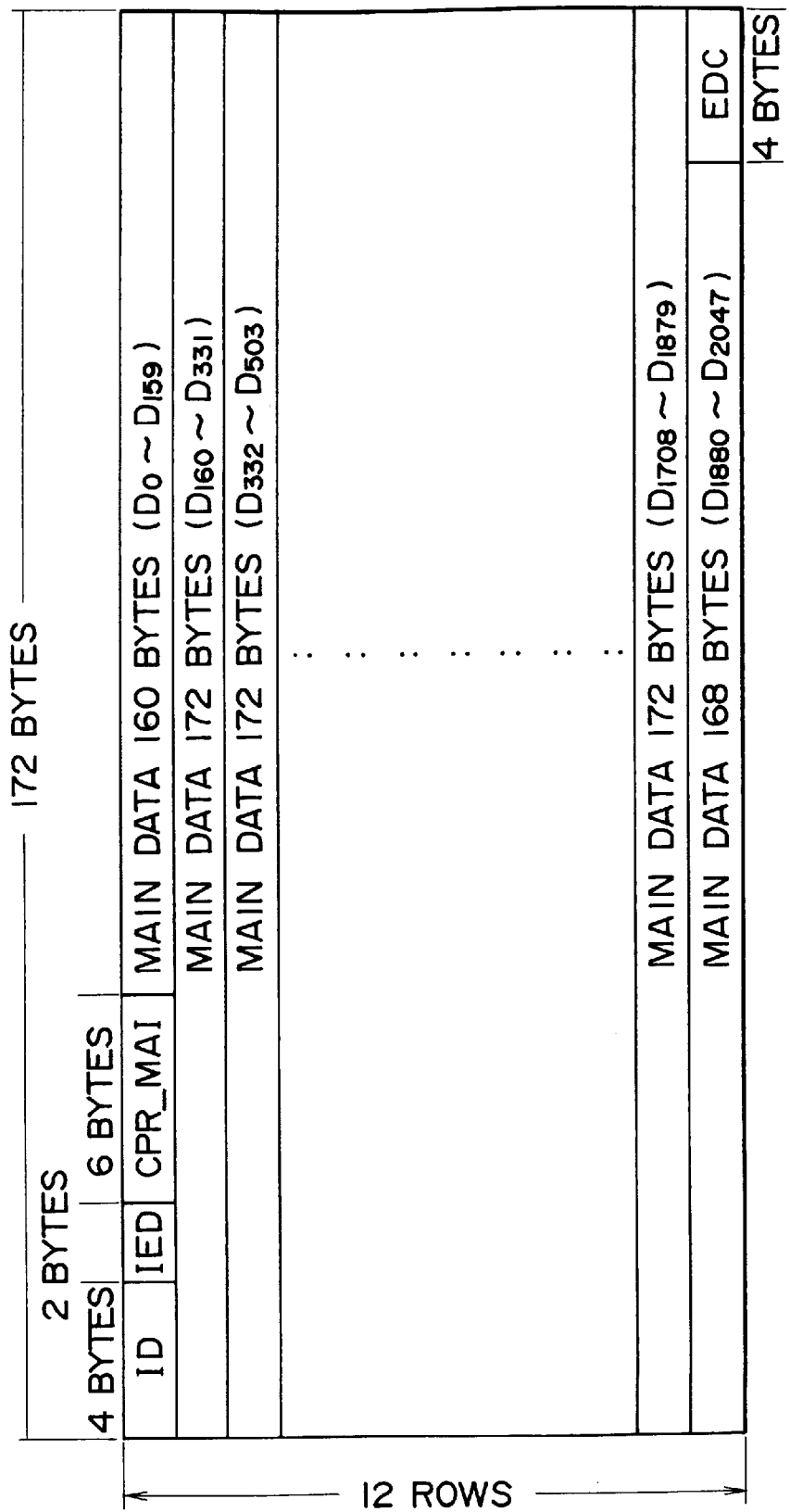
FIG. 9 is a view illustrating the configuration of a sector of a disc.

If, however, it is determined in step S23 that the loaded disc is a DVD, then control advances to step S26, in which CPU 15 reads a reflectivity from a sector ID. In particular, a DVD is formed with a plurality of sectors, each further being formed with a construction as illustrated in FIG. 9. A sector ID of 4 bytes is recorded at the top of each sector.

FIG. 10 illustrates a detailed construction of the sector ID of 4 bytes of FIG. 9. As is shown in FIG. 10, the sector ID is composed of one byte of sector information and a sector number of 3 bytes. A reflectivity indicator (Reflectivity) is defined at a bit b29 within the sector information. This bit is set to 0 when the reflectivity is higher than 40%, and is set to 1 when the reflectivity is equal to or lower than 40%. A single layer disc has a reflectivity higher than 40%, and a double layer disc has a reflectivity equal to or lower than 40%. Accordingly, with a single layer disc, this bit will be set to 0, but with a double layer disc, this bit will be set to 1.

In step S27, CPU 15 determines whether or not the reflectivity indicator bit matches the parameters currently set within the apparatus. In particular, when the reflectivity indicator bit is set to 0, if the parameters corresponding to single layer mode are set, then it is determined that the parameters are properly set. However, if the parameters corresponding to double layer mode are set, then it is determined that the parameters are improperly set. Similarly, where the reflectivity indicator bit is set to 1, when the reproduction mode is set to double layer mode, it is determined that the parameters are properly set. However, if the reproduction mode is set to single layer mode, then it is determined that the parameters are improperly set.

If it is determined in step S27 that the parameters have been improperly set, control advances to step S28, in which the CPU 15 controls servo processor 18 to turn off the thread servoing. Then, in step S29 CPU 15 controls CLV controller 11 to turn off the CLV servoing and start a constant torque acceleration operation. Further, in step S30, CPU 15 controls servo processor 18 to turn off the tracking servoing, and in step S31, CPU 15 controls servo processor 18 to turn off the focusing servoing. Then, in step S32, CPU 15 controls servo processor 18 to move pickup 5 a predetermined small distance along disc 1 in a radial direction so that disc 1 may be reproduced from a slightly different location on the disc. Since the thread servoing, tracking servoing and focusing servoing have all been turned off in steps S28, S30 and S31, when these servoing operations are turned on again later, the position on disc 1 from which information is being read is different from the prior position. Thus, a different distance to the lens OPT of pickup 5, or the like may be generated as a result of an eccentricity in the disc, or the like. Accordingly, while the processing in step S32 can be substantially omitted by simply turning off each of the servoing, and then turning them on again in order to re-read the data, if pickup 5 is to be moved, the processing in step S32 must be provided.

Thereafter, control returns to step S10, in which parameters corresponding to the reflectivity confirmed in step S26 are set, and processing similar to that described above is executed repetitively.

In this manner, when it is determined in step S27 reflectivity data recorded in the sector ID of a DVD that parameters have been improperly set, since re-setting of the parameters is performed, it can be assured that the proper parameters will be used.

If it is determined in step S27 that the parameters which are set match the reflectivity indicator bit read out from the sector ID, then control advances to step S33, in which CPU 15 controls servo processor 18 to move pickup 5 to the control data area of the DVD. Then, in step S34, the control data are read, and a disc size and a disc structure recorded in the control data are confirmed.

Figure 11:
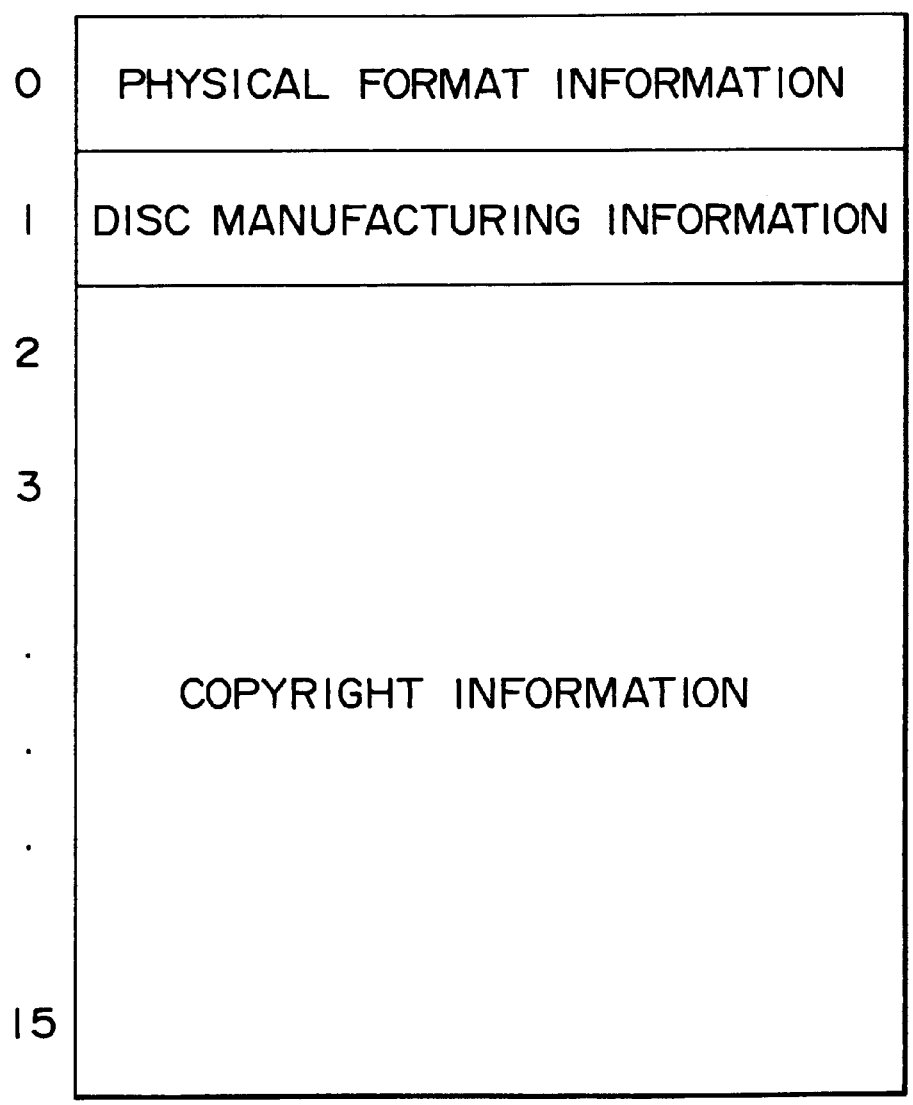
FIG. 11 is a view illustrating the configuration of control data block of a DVD.

Control data are recorded on a DVD in such a manner as illustrated in FIG. 11 in the control data area (control data block) of the DVD. Physical format information is recorded in the 0th sector; disc manufacturing information is recorded in the first sector; and copyright information is recorded in the second to fifteenth sectors.

Within the physical format information, Disc size and minimum read-out rate is recorded in the first byte and Disc structure is recorded in the second byte as illustrated in FIG. 12. The disc size and minimum read-out rate recorded as illustrated in FIG. 13. This Disc size is 0000 for a 12 cm disc, and 0001 for an 8 cm disc. Further, as illustrated in FIG. 14, Number of layers, Track path and Layer type are recorded in Disc structure (second byte). Number of layers is 00 for a single layer disc, and 01 for a double layer disc.

In step S35, CPU 15 finally determines the size of the disc from the information read from the physical format information and determines whether the loaded disc is a single or double layer disc.

While the invention is described making reference to a DVD and a CD above, by way of example, the invention can be applied also where data are to be recorded onto or reproduced from any other disc.

As described above, with a disc recording and/or reproduction apparatus and method of the invention since the type of disc which is loaded is determined based upon the comparison of the level of energy of reflected light used for recording or reproduction, which is obtained when the irradiation means is moved from a first position to a second position and a reference level of energy, the type of disc which is loaded can be determined, and various parameters for recording or reproduction of the disc can be set before various servoing operations are performed.

It will thus be seen that the objects set forth above, among those made apparent from the preceding description, are efficiently attained and, since certain changes may be made in carrying out the method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A disc recording and/or reproduction apparatus, comprising:
   irradiation means for irradiating a light beam upon a disc;
   detection means for detecting an amount of energy of said light beam reflected from said disc;

comparing means for comparing said value of said detected energy level with a reference level PIR1, said reference level being determined according to the expression:

$$PIR1=(PI(dldisc, dlmode)-PIref) \times (a/b) \times (c/d) + (PI(sldisc, slmode) - PIref) \times (e/f) \times \frac{1}{2} + PIref$$

where PI(dldisc, dlmode) is the expected level of a pull in signal when a double layer disc is reproduced in a double layer mode; PI(sldisc, slmode) is the expected level of a pull in signal when a single layer disc is reproduced in a single layer mode; PIref is a fixed DC component of both PI(dldisc, dlmode) and PI(sldisc, slmode); a and b represent relative values of laser power where a:b=the laser power when reproducing is being performed in single layer mode: the laser power when reproducing is being performed in double layer mode; c and d represent relative values of the gain of a preamplifier where c:d=the gain of the preamplifier when reproducing is being performed in single layer mode: the gain of the preamplifier when reproducing is being performed in double layer mode; e and f represent relative values of the pull in signal where e:f=the level of the pull in signal when focusing is off: the level of the pull in signal when focusing is on; and determination means for determining a type of disc based upon the result of said comparison of said comparing means.

2. The disc recording and/or reproduction apparatus of claim 1, further comprising control means for controlling focusing servoing of said irradiation means.

3. The disc recording and/or reproduction apparatus of claim 1, further comprising moving means for moving a focal point of said irradiation means in a direction perpendicular to said disc.

4. The disc recording and/or reproduction apparatus of claim 3, wherein said detection means detects said energy level when said focal point of said irradiation means is moved by said moving means.

5. The disc recording and/or reproduction apparatus of claim 4, wherein said detection means detects a maximum value of said detected energy level when said focal point of said irradiation means is moved from a first predetermined position to a second predetermined position.

6. The disc recording and/or reproduction apparatus of claim 5, wherein said second position is closer to said disc than said first position.

7. The disc recording and/or reproduction apparatus of claim 1, wherein at least one parameter is set based upon the type of disk determined by said determination means.

8. The disc recording and/or reproduction apparatus of claim 1, wherein said maximum value of said detected energy level is detected when focusing servoing is not locked.

9. The disc recording and/or reproduction apparatus of claim 1, wherein said maximum value of said detected energy level is detected when focusing servoing is locked.

10. The disc recording and/or reproduction apparatus of claim 1, wherein said maximum value of said detected energy level is first detected when focusing servoing is not locked, and is then detected when focusing servoing is locked, said predetermined reference level when said focusing servoing is not locked having a value different from said predetermined reference level when said focusing servoing is locked.

11. The disc recording and/or reproduction apparatus of claim 1, wherein said determination means determines between types of discs having different reflectivities.

12. The disc recording and/or reproduction apparatus of claim 1, wherein said determination means determines between types of discs having different numbers of information layers.

13. The disc recording and/or reproduction apparatus of claim 1, wherein said irradiation means further comprises reproducing means for reproducing data recorded on said disc.

14. The disc recording and/or reproduction apparatus of claim 13, wherein said reproducing means reads at least information indicating the type of said disc.

15. The disc recording and/or reproduction apparatus of claim 13, wherein said reproducing means reads at least information indicating a reflectivity of said disc.

16. The disc recording and/or reproduction apparatus of claim 1, wherein said irradiation means is first configured to irradiate a disc having a single information layer.

17. A disc recording and/or reproduction apparatus, comprising:

irradiation means for irradiating a light beam upon a disc;

rotating means for rotating said disc, said disc placing a load upon said rotating means;

first determination means for determining the size of said disc based upon said load placed upon said rotating means;

detection means for detecting an amount of energy of said light beam reflected from said disc; and second determination means for determining whether a disc is present in response to said disc size determination made by said first determination means and said amount of energy detected by said detection means.

18. The disc recording and/or reproduction apparatus of claim 17, wherein said irradiation means irradiates a second light beam upon said disc which is not used for recording or reproducing data on said disc.

19. The disc recording and/or reproduction apparatus of claim 18, further comprising tilt control means for positioning said light beam in a position perpendicular to said disc, said tilt control means employing said second light beam.

20. The disc recording and/or reproduction apparatus of claim 18, further comprising disc type discrimination means for discriminating between different types of discs, said disc type discrimination means employing said second light beam.

21. The disc recording and/or reproduction apparatus of claim 17, further comprising timing means for determining an amount of time necessary for said disc to reach a predetermined speed of rotation, said first determination means determining said load placed upon said rotating means by said amount of time determined by said timing means.

22. The disc recording and/or reproduction apparatus of claim 21, wherein said first determination means compares said amount of time determined by said timing means with at least one predetermined reference time.

23. A disc recording and/or reproduction method, comprising the steps of:

irradiating a light beam upon a disc;

detecting an amount of energy of said light beam reflected from said disc;

comparing said value of said detected energy level with a reference level PIR1, said reference level being determined according to the expression:

$$PIR1=(PI(dldisc, dlmode)-PIref) \times (a/b) \times (c/d) + (PI(sldisc, slmode) - PIref) \times (e/f) \times \frac{1}{2} + PIref$$

where PI(dldisc, dlmode) is the expected level of a pull in signal when a double layer disc is reproduced in a double layer mode; PI(sldisc, slmode) is the expected level of a pull in signal when a single layer disc is reproduced in a single layer mode; PIref is a fixed DC component of both PI(dldisc, dlmode) and PI(sldisc, slmode); a and b represent relative values of laser power where a:b=the laser power when reproducing is being performed in single layer mode: the laser power when reproducing is being performed in double layer mode; c and d represent relative values of the gain of a preamplifier where c:d=the gain of the preamplifier when reproducing is being performed in single layer mode: the gain of the preamplifier when reproducing is being performed in double layer mode; e and f represent relative values of the pull in signal where e:f=the level of the pull in signal when focusing is off: the level of the pull in signal when focusing is on; and determining a type of disc based upon the result of said comparison.

24. The disc recording and/or reproduction method of claim 23, further comprising the step of controlling focusing servoing of said irradiated light beam.

25. The disc recording and/or reproduction method of claim 23, further comprising the step of moving a focal point of said irradiated light beam in a direction perpendicular to said disc.

26. The disc recording and/or reproduction method of claim 25, further comprising the step of detecting said energy level when said focal point of said irradiated light beam is moved.

27. The disc recording and/or reproduction method of claim 26, further comprising the step of detecting a maximum value of said detected energy level when said focal point of said irradiated light beam is moved from a first predetermined position to a second predetermined position.

28. The disc recording and/or reproduction method of claim 27, wherein said second position is closer to said disc than said first position.

29. The disc recording and/or reproduction method of claim 23, further comprising the step of setting at least one parameter based upon the type of disk determined.

30. The disc recording and/or reproduction method of claim 23, further comprising the step of detecting said maximum value of said detected, energy level when focusing servoing is not locked.

31. The disc recording and/or reproduction method of claim 23, further comprising the step of detecting said maximum value of said detected energy level when focusing servoing is locked.

32. The disc recording and/or reproduction method of claim 23, further comprising the steps of:

detecting said maximum value of said detected energy level when focusing servoing is not locked; and then detecting said maximum value of said detected energy level when focusing servoing is locked, said predetermined reference level when said focusing servoing is not locked having a value different from said predetermined reference level when said focusing servoing is locked.

33. The disc recording and/or reproduction method of claim 23, further comprising the step of determining between types of discs having different reflectivities.

34. The disc recording and/or reproduction method of claim 23, further comprising the step of determining between types of discs having different numbers of information layers.

35. The disc recording and/or reproduction method of claim 23, further comprising the step of reproducing data recorded on said disc.

36. The disc recording and/or reproduction method of claim 35, further comprising the step of reading at least information indicating the type of said disc.

37. The disc recording and/or reproduction method of claim 35, further comprising the step of reading at least information indicating a reflectivity of said disc.

38. The disc recording and/or reproduction method of claim 23, further comprising the step of first configuring said irradiated light beam to irradiate a disc having a single information layer.

39. A disc recording and/or reproduction method, comprising the steps of:

irradiating a light beam upon a disc;

rotating said disc, said disc generating a load;

determining the size of said disc based upon said generated load;

detecting an amount of energy of said light beam reflected from said disc; and determining whether a disc is present in response to said disc size determination and said amount of reflected energy detected.

40. The disc recording and/or reproduction method of claim 39, further comprising the step of irradiating a second light beam upon said disc which is not used for recording or reproducing data on said disc.

41. The disc recording and/or reproduction method of claim 40, further comprising the steps of:

detecting a second amount of energy of said second light beam reflected from said disc;

detecting any tilt in said disc from said second amount of reflected energy; and positioning said light beam in a position perpendicular to said disc.

42. The disc recording and/or reproduction method of claim 40, further comprising the steps of:

detecting a second amount of energy of said second light beam reflected from said disc;

discriminating between different types of discs from said second amount of reflected energy.

43. The disc recording and/or reproduction method of claim 39, further comprising the steps of:

determining an amount of time necessary for said disc to reach a predetermined speed of rotation; and determining said load generated by said disc said amount of time determined.

44. The disc recording and/or reproduction method of claim 43, further comprising the step of comparing said amount of time recorded with at least one predetermined reference time.

* * * * *